Feb. 13, 1934.　　　　H. H. HARR　　　　1,946,691
BEER COOLING AND DISPENSING APPARATUS
Filed April 17, 1933　　　2 Sheets-Sheet 1
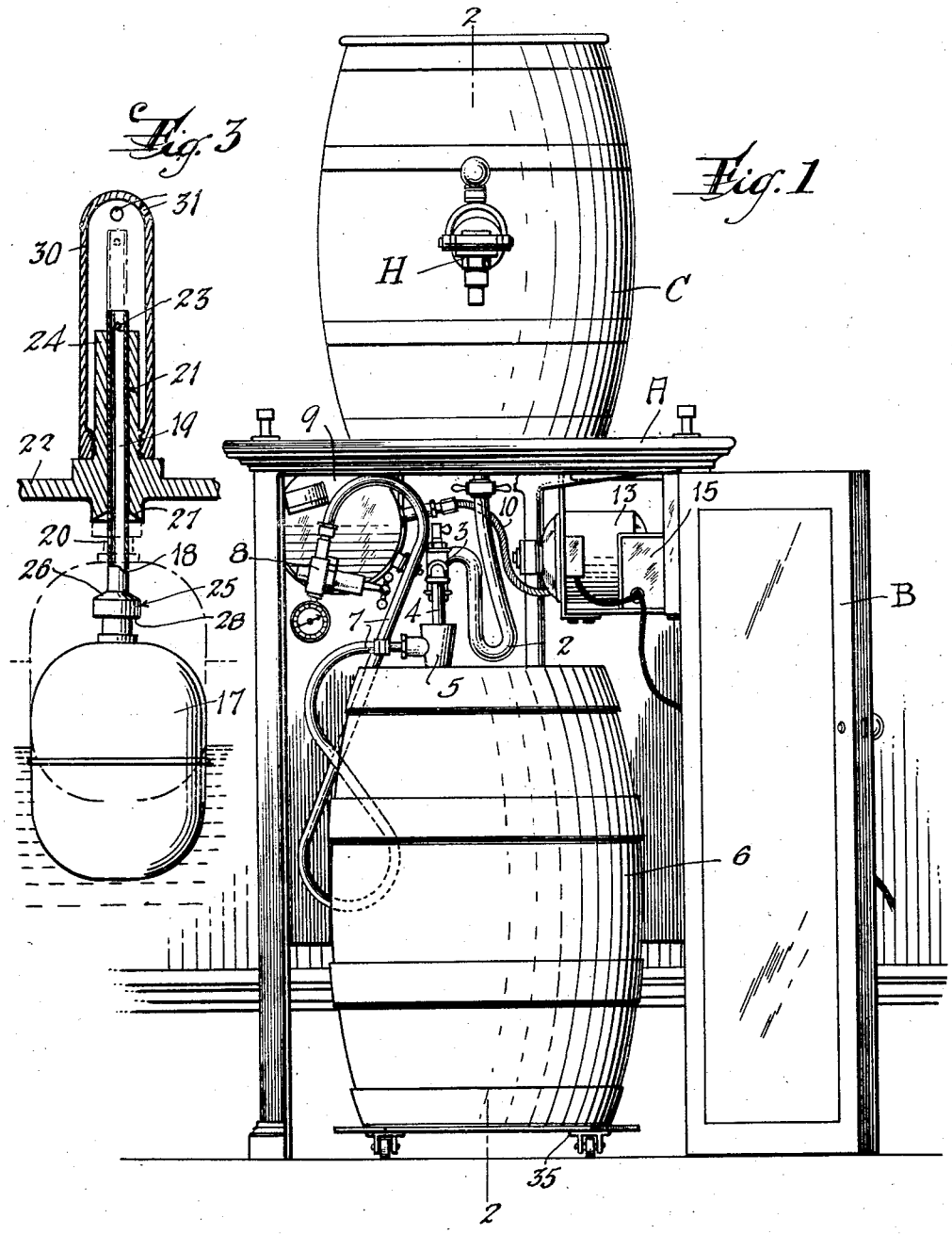
INVENTOR
Herman H. Harr
BY
Harry B. Rook
ATTORNEY Feb. 13, 1934.    H. H. HARR    1,946,691
BEER COOLING AND DISPENSING APPARATUS
Filed April 17, 1933    2 Sheets-Sheet 2
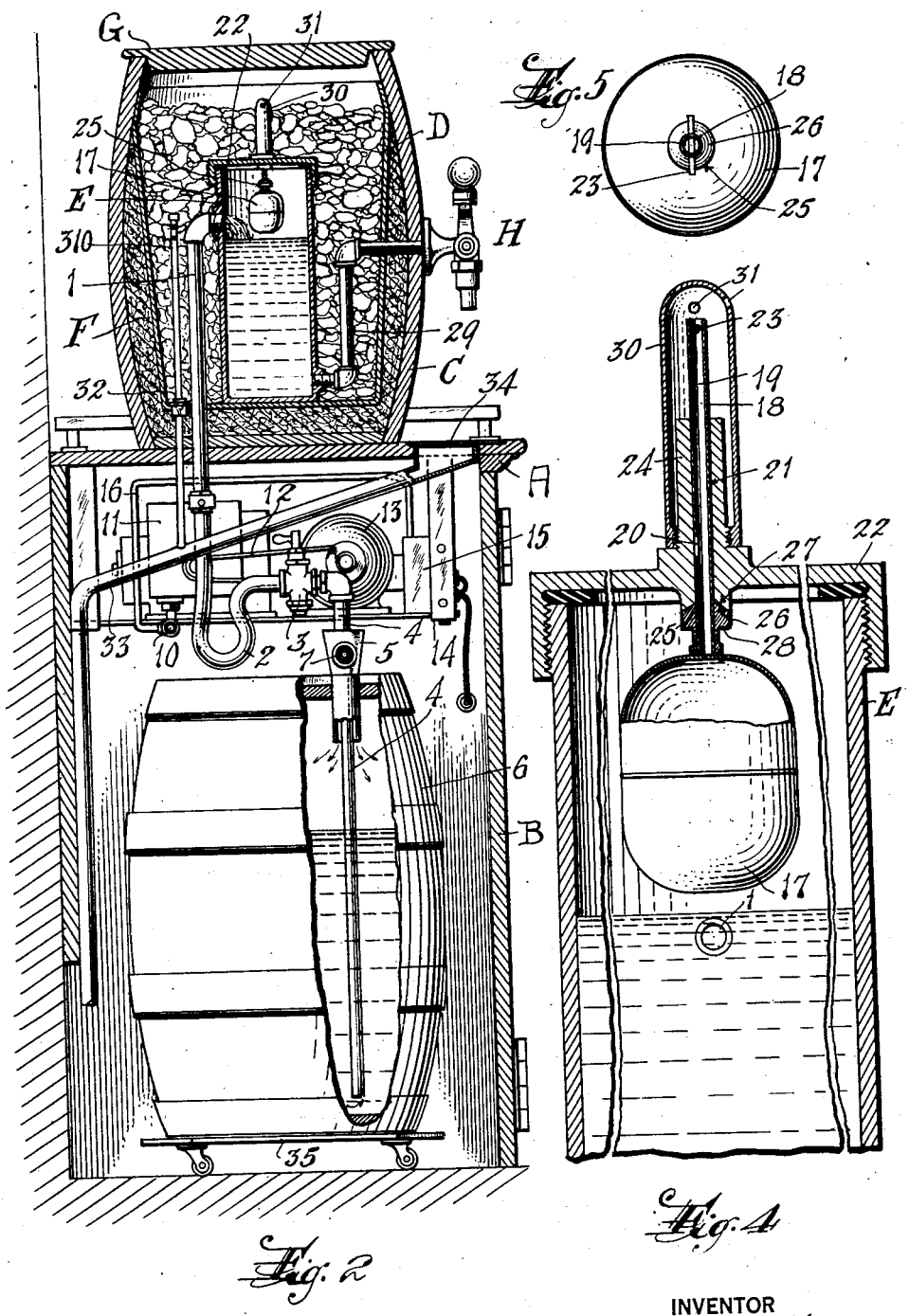
INVENTOR
Herman H. Harr,
BY
Harry B. Cook.
ATTORNEY Patented Feb. 13, 1934

1,946,691

UNITED STATES PATENT OFFICE 1,946,691

BEER COOLING AND DISPENSING APPARATUS

Herman H. Harr, Newark, N. J., assignor, by mesne assignments, to Jack Cowan, Newark, N. J.

Application April 17, 1933. Serial No. 666,396

2 Claims. (Cl. 225—1)

This invention relates in general to apparatus for dispensing liquid, particularly beverages and especially beer; and generally the invention contemplates apparatus for withdrawing or forcing beer under gas pressure from a barrel or other supply into a cooling chamber of relatively small capacity, and dispensing the beer as desired from said cooling chamber under the same gas pressure through a draft faucet or the like.

One object of my invention is to provide dispensing apparatus of this character which shall require a minimum of manual attention for operation, shall be dependable and shall therefore include as a unit a novel and improved combination of parts whereby beer can be pumped automatically from a barrel into a cooling chamber under pressure of air or other suitable gas forced into the barrel, the air in the cooling chamber shall be automatically vented as the beer is forced into the chamber, the vent shall be closed automatically to prevent escape of beer, and a predetermined pressure shall be maintained constantly and automatically in said barrel and cooling chamber while the barrel is connected to said cooling chamber, so that the cooling chamber shall be supplied constantly from the barrel and the beer can be drawn from the cooling chamber under said pressure through a draught faucet or the like even after all beer has been removed from the barrel and until the cooling chamber has been emptied.

Another prime object of my invention is to provide apparatus of the general character described embodying novel and improved features of construction including a vent valve to vent air from the cooling chamber as beer is forced into the chamber and which shall be automatically closed by the beer when the latter reaches a predetermined level in the cooling chamber to prevent escape of the beer and shall then be automatically held closed by the pressure of the gas and until the gas pressure has been reduced below a predetermined minimum, as by release of the gas from the cooling chamber when removing an empty barrel, whereby it shall be possible to continue to draw beer from said cooling chamber under pressure after all beer has been forced from the barrel and until all of the beer has been drawn from the cooling chamber, no beer shall be wasted during the removal of an empty barrel and the connection of another full barrel to the cooling chamber and a supply of beer in the cooling chamber shall be ensured for a considerable period after a barrel has been emptied to permit a full barrel to be procured before the supply in the cooling chamber has been completely exhausted.

A further object is to provide in such an apparatus, a novel and improved vent valve including a float for automatically closing the valve upon rise of the level of the beer in the cooling chamber to a predetermined point, and means automatically actuated by a predetermined pressure of gas in said chamber after the valve has been closed by said float for holding the valve closed even after the level of the beer has receded below said predetermined point and for permitting said valve to automatically open when said gas pressure is reduced below said predetermined pressure, whereby said chamber can be easily filled with beer under gas pressure and the beer can be withdrawn from the chamber under pressure until all beer has been removed from the chamber.

Other objects are to provide such a valve which shall be simple and inexpensive in construction and reliable in operation, and to obtain other advantages and results as will be brought out by the following description.

Referring to the accompanying drawings in which corresponding and like parts are designated by the same reference characters throughout the several views, Figure 1 is a front elevation of a beer dispensing apparatus embodying my invention, showing the door of the cabinet in open position.

Figure 2 is a transverse vertical sectional view on the line 2—2 of Figure 1.

Figure 3 is an enlarged fragmentary vertical sectional view through the vent valve, showing the valve in open position by solid lines and in closed position by dot and dash lines.

Figure 4 is an enlarged fragmentary vertical sectional view through the upper part of the dispensing chamber and the vent valve, showing the valve in closed position and the level of the liquid below the predetermined point at which the valve is closed, and Figure 5 is a detached top plan view of the valve body.

Specifically describing the illustrated embodiment of the invention, my beer dispensing apparatus preferably includes a cabinet A having a front door B, for housing the barrel or other supply container and certain parts of the apparatus. Upon the cabinet is arranged a refrigerating casing C which is in the form of a representation of a barrel and has therein an ice receptacle D in which is mounted a liquid cooling and dispensing chamber E. The ice receptacle D is heat insulated by insulating material F interposed between the receptacle and the walls of the casing C, and access to the ice receptacle and to the dispensing chamber E is provided through an opening in the top of the casing C which is normally closed by a cover G.

The dispensing chamber E has connected thereto a liquid inlet pipe 1 which extends downwardly into the cabinet A and is connected to one end of a flexible hose 2 the other end of which is connected to a valve 3 on the end of a draft pipe 4 which is fitted into a known type of packed bung tap 5 which is in turn fitted into the bung hole of a barrel or other supply container 6 for the liquid to be dispensed, for example, beer. The draft pipe 4 extends into the barrel 6 to a point close to the bottom of the barrel, and beer or other liquid is forced upwardly through the draft pipe by gas pressure which is supplied through the bung tap 5 in known manner through a flexible hose 7 which is connected to a pressure reducing valve 8 which is in turn connected to a gas pressure reservoir 9 that is suspended from the walls of the cabinet A.

Gas under pressure is stored in the reservoir or tank 9 and is supplied to the reservoir through a pipe 10 from a known type of pump 11 which is driven by a belt connection 12 from an electric motor 13. The pump 11 and motor 13 are mounted on a shelf 14 suspended from the walls of the cabinet A. In accordance with the invention, the pump 11 generates pressure in the reservoir 9 of about fifty to sixty pounds, and the pressure reducing valve 8 reduces this pressure to from four to six pounds which latter pressure is supplied to the barrel 6 through the bung tap 5. Preferably an automatic pressure operated switch mechanism 15 of known construction is provided for controlling the motor 13 so that when a predetermined pressure in the reservoir 9 is reached, the motor and pump are stopped while when the pressure in the reservoir falls below a predetermined minimum, the motor and pump are started to raise the pressure. With this construction, the liquid, for example, beer, is constantly maintained under pressure in the barrel 6 and is forced through the draft pipe 4 and inlet pipe 1 into the cooling and dispensing chamber E.

Assuming the dispensing chamber to be empty and containing air at atmospheric pressure, in order to force the beer into the dispensing chamber E, it is necessary to permit the air in the chamber to vent into the atmosphere; and of course it is necessary to provide means for closing said vent to prevent escape of the liquid therethrough. An important feature of my invention is a vent valve for accomplishing these purposes. As shown on the drawings this vent valve includes a float 17 having a stem 18 projecting coaxially therefrom and formed with a longitudinal passage 19 with one end of which communicates a lateral port 20. The float 17 is arranged within the dispensing chamber, while the stem 19 is slidable in and projects outwardly from a vertical opening 21 in the cover 22 of the dispensing chamber so that the outer open end of the passage 19 is exposed to the atmosphere. The stem 18 freely slides in the opening 21, and movement of the stem and float 17 downwardly is limited by a cross pin 23 in the outer end of the stem which abuts the top of the boss 24 on the cover 22 as clearly shown in Figure 3 of the drawings. With the float and stem in this position, the port 20 communicates with the interior of the chamber so that gas in the chamber may flow through the port into the longitudinal passage 19 and thence into the atmosphere. Between the port 20 and the float 17, a valve head 25 is mounted on the stem 18, the head having a conical face 26 to cooperate with a seat 27 on the underside of the cover 22. The valve head 25 may have a flat annular surface 28 in substantially opposed relation to the face 26 of the valve head at the side of the head away from the valve seat. The float 17 and the other movable parts of the valve are preferably made as light in weight as possible and of such proportions that after the valve face 26 has engaged the seat 27, the valve will be held in this closed position by the pressure of the gas within the dispensing chamber. It will be observed that when the valve is opened as shown in Figure 3, the pressure on various portions of the valve is balanced so that gravity tends to influence the valve into open position. When the valve is closed as shown in Figure 4 of the drawings and in dot and dash lines in Figure 3, the face 26 of the valve head is relieved of pressure and the difference in pressure at the two sides of the valve that is within the chamber and outside of the chamber tends to force the valve head against its seat so as to hold the valve in closed position against action of gravity. Obviously, the weight of the valve, the areas of the surfaces exposed to gas pressure and the amount of pressure must be properly related to each other. While the valve generally is closed by the rise of beer in the chamber E, I have found from experiment that without any liquid in the chamber E and with the valve open, when gas under pressure is admitted to the chamber and reaches a certain pressure, the valve is forcibly closed by the rush of gas from the vent opening around the valve, and is thereafter held closed by the gas pressure.

In operation of the valve, assuming that the dispensing chamber is being initially filled, that the reservoir 9 is charged with compressed gas, and that the beer from the barrel is forced into the dispensing chamber as shown in Figure 2, either under influence of the gases originally in the beer barrel, or by the pressure from said reservoir, the vent valve is in open position so that the air in the chamber is escaping through the port 20 and passage 19. As the level of the beer in the dispensing chamber rises to the float, the float is gradually raised so that the stem 19 is slid into the opening 21 and the port 20 is closed so as to restrict further escape of the air. The level of the beer continues to rise, and the valve head 25 approaches its seat 27, the pressure in the chamber E in the meantime gradually rising. When the level of the beer has reached a point to cause the valve face 26 to engage the seat 27 the valve is entirely closed, as shown by dot and dash lines in Figure 3 and in Figure 4. Normally, while there is beer in the barrel 6, the chamber E is kept filled with beer at a constant and uniform pressure, but when the beer has been exhausted from the barrel, and is withdrawn from the chamber E, the level of the beer in the chamber will gradually fall so as to eventually recede away from the float. However, the vent valve will remain closed and the beer continues to be maintained, and can be withdrawn, under such pressure from the dispensing chamber until the supply therein has been exhausted.

As is known by those skilled in the art, it is highly desirable that the beer be dispensed under pressure so that it may be highly charged with gas to avoid flatness. My structure has the further advantage that all of the beer in the dispensing chamber can be withdrawn in this satisfactory condition and for a considerable period after a barrel has been emptied to permit a full barrel to be procured before the supply is completely exhausted; no beer is wasted in removing an empty barrel and connecting a new one, and the last of the beer in one barrel need not but may be mixed with the beer in the new barrel, as desired.

The beer may be withdrawn from the dispensing chamber E through an outlet pipe 29 having a draught faucet H at the outer end thereof. The outlet pipe 29 is connected adjacent the bottom of a dispensing chamber so that practically all the beer can be withdrawn from the chamber, but this connection of the outlet pipe has the further advantage that the beer is withdrawn from the coolest part of the dispensing chamber, it being understood that the dispensing chamber is cooled by the ice in the receptacle D and that cold liquid usually settles to the bottom of a receptacle. The inlet pipe 1 is connected adjacent the top of the dispensing chamber to supply fresh warm beer in spaced relation to the outlet to allow adequate cooling.

To protect the vent valve from the ice in the receptacle D, a cap 30 is provided which has perforations 31 above the ice level to permit air to escape from the valve stem.

For draining the water from the ice receptacle a drain pipe 310 may be arranged in the receptacle and separably connected at 32 to a coupling so that the pipe 310 can be removed for cleaning. The coupling in turn is connected to a drain pipe 33 which also serves to carry away drippings from a drip receptacle 34 beneath the draught faucet H.

For convenience in placing and removing barrels into and from the cabinet, a wheeled truck 35 may be provided for supporting the barrels.

While I have shown and described the invention as embodied in certain details of construction it should be understood that this is primarily for the purpose of illustrating the principles of the invention and that many modifications and changes may be made in the details of construction without departing from the spirit or scope of the invention.

Having thus described my invention, what I claim is:

1. In apparatus of the character described, the combination with a liquid supply container, of a dispensing chamber having a draught faucet, means for forcing liquid under gas pressure from said supply chamber to said dispensing chamber and for maintaining pressure in said dispensing chamber, said dispensing chamber having a vertical vent opening, and a valve for closing said opening including a stem slidable in said opening and having a longitudinal passage communicating at its outer end with the atmosphere and a lateral port communicating with the inner end of said passage, a valve seat at the inner end of said opening within said chamber, a valve head on said stem inwardly of said lateral port and within said chamber having a face to engage said seat, means for limiting movement of said stem into said chamber whereby air within the chamber may escape through said lateral port and said longitudinal passage, a float directly connected to said stem inwardly of said valve head to force said valve head against said seat when the level of liquid in said chamber reaches a predetermined point, said valve having such weight and surfaces subject to pressure in said chamber that after said valve head has been moved against said seat by action of the float, said valve will be so held until the pressure in the chamber is reduced below a predetermined point.

2. The combination of a chamber for receiving and holding liquid constantly under gas pressure, means for withdrawing liquid from said chamber under said pressure, said chamber having a vertical vent opening, and a valve for closing said opening including a stem slidable in said opening and having a longitudinal passage communicating at its outer end with the atmosphere and a lateral port communicating with the inner end of said passage, a valve seat at the inner end of said opening within said chamber, a valve head on said stem inwardly of said lateral port and within said chamber having a face to engage said seat, means for limiting movement of said stem into said chamber whereby air within the chamber may escape through said lateral port and said longitudinal passage, a float directly connected to said stem inwardly of said valve head to force said valve head against said seat when the level of liquid in said chamber reaches a predetermined point, said valve being of such weight and having surfaces subject to gas pressure in said chamber so that after said valve head has been moved against said seat by action of said float said valve will be so held until the pressure in said chamber is reduced below a predetermined point.

HERMAN H. HARR.